US011460452B2

(12) United States Patent
Kent et al.

(10) Patent No.: US 11,460,452 B2
(45) Date of Patent: Oct. 4, 2022

(54) DEVICES AND SYSTEMS FOR CHROMATOGRAPHY COLUMN BED SUPPORT MANAGEMENT AND RELATED METHODS

(71) Applicant: Regeneron Pharmaceuticals, Inc., Tarrytown, NY (US)

(72) Inventors: Kevin Kent, Niskayuna, NY (US); Joseph Gallea, Albany, NY (US); Benjamin Binga, Saratoga Springs, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 722 days.

(21) Appl. No.: 16/204,225

(22) Filed: Nov. 29, 2018

(65) Prior Publication Data
US 2019/0178854 A1    Jun. 13, 2019

Related U.S. Application Data

(60) Provisional application No. 62/598,091, filed on Dec. 13, 2017.

(51) Int. Cl.
*B01D 53/02*     (2006.01)
*G01N 30/60*     (2006.01)
*B01D 15/22*     (2006.01)

(52) U.S. Cl.
CPC ......... *G01N 30/6047* (2013.01); *B01D 15/22* (2013.01); *G01N 30/6052* (2013.01)

(58) Field of Classification Search
CPC . B01D 15/22; G01N 30/6047; G01N 30/6052
See application file for complete search history.

(56) References Cited

U.S. PATENT DOCUMENTS 5,219,216 A    6/1993  Hassel et al.
7,070,959 B1   7/2006  Papadopoulos et al.
(Continued)

FOREIGN PATENT DOCUMENTS

SU          746281 A1    7/1980

OTHER PUBLICATIONS

International Search Report for corresponding International Application No. PCT/US2018/063029 dated Apr. 18, 2019 (8 pages).
(Continued)

*Primary Examiner* — Christopher P Jones
(74) *Attorney, Agent, or Firm* — Bookoff McAndrews, PLLC

(57) ABSTRACT

Embodiments of the present disclosure may assist in managing, storing, using, and re-using dedicated chromatography column bed supports. For example, devices and systems disclosed herein may include reusable cases for storing dedicated column bed supports when the column bed supports are not in use. Such cases may include one or more dividers and inserts configured to fit column bed supports, and may be designed and built specifically to ensure efficient, secure storage of column bed supports while minimizing risk of damaging or contaminating them. Methods disclosed herein may include performing a particular chromatography operation in a column, removing the column bed supports from the column, storing the column bed supports in a column bed support storage case, and installing another set of column bed supports in the column for another chromatography operation.

19 Claims, 6 Drawing Sheets

(56) References Cited

U.S. PATENT DOCUMENTS

| | | |
|---|---|---|
| 7,303,746 B2 | 12/2007 | Wiegand et al. |
| 7,303,747 B2 | 12/2007 | Wiegand et al. |
| 7,306,799 B2 | 12/2007 | Wiegand et al. |
| 7,374,757 B2 | 5/2008 | Papadopoulos et al. |
| 7,374,758 B2 | 5/2008 | Papadopoulos et al. |
| 7,531,173 B2 | 5/2009 | Wiegand et al. |
| 7,608,261 B2 | 10/2009 | Furfine et al. |
| 7,972,598 B2 | 7/2011 | Daly et al. |
| 8,029,791 B2 | 10/2011 | Papadopoulos et al. |
| 8,092,803 B2 | 1/2012 | Furfine et al. |
| 8,343,349 B2 | 1/2013 | Eriksson |
| 8,343,737 B2 | 1/2013 | Papadopoulos et al. |
| 8,647,842 B2 | 2/2014 | Papadopoulos et al. |
| 2013/0149310 A1 | 6/2013 | Jasson et al. |
| 2014/0263012 A1* | 9/2014 | Gebauer .............. G01N 30/466 210/198.2 |
| 2014/0302053 A1 | 10/2014 | Huang et al. |
| 2014/0356370 A1 | 12/2014 | Swergold et al. |
| 2014/0356371 A1 | 12/2014 | Swergold et al. |
| 2014/0356372 A1 | 12/2014 | Stahl et al. |
| 2016/0152717 A1 | 6/2016 | Cao et al. |
| 2016/0250566 A1 | 9/2016 | Bailey |
| 2019/0366235 A1* | 12/2019 | de los Reyes ......... G01N 30/52 |

OTHER PUBLICATIONS

Eurasian Search Report issued in EA202193329 dated Jun. 20, 2022 with English Translation (7 pages).

\* cited by examiner

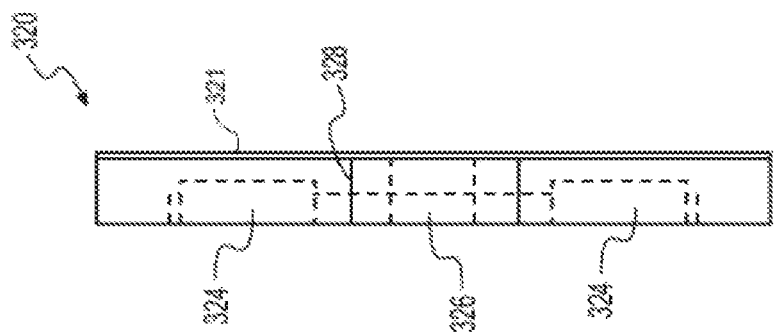
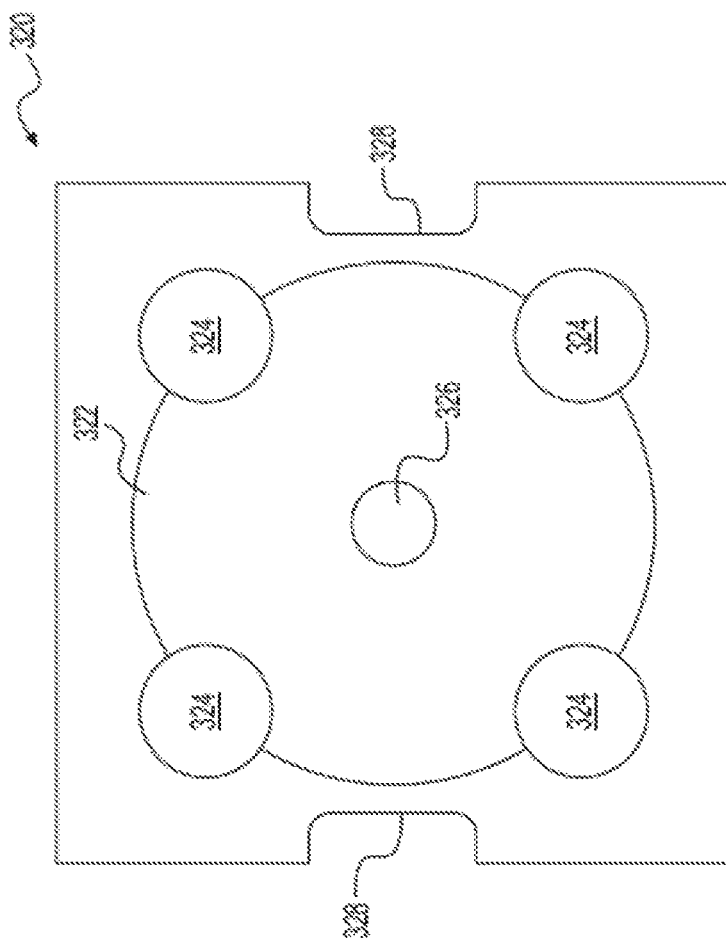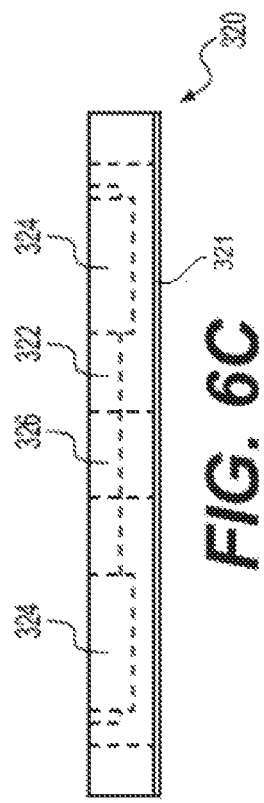

DEVICES AND SYSTEMS FOR CHROMATOGRAPHY COLUMN BED SUPPORT MANAGEMENT AND RELATED METHODS

CROSS-REFERENCE TO RELATED APPLICATION(S)

This patent application claims the benefit under 35 U.S.C. § 119 to U.S. Provisional Patent Application No. 62/598,091, filed on Dec. 13, 2017, the entirety of which is incorporated herein by reference.

TECHNICAL FIELD

Aspects of the present disclosure relate to devices, systems, and methods for managing chromatography column bed supports. More specifically, embodiments of the present disclosure relate to devices, systems, and methods for using, reusing, and storing product dedicated chromatography column bed supports.

BACKGROUND

Column chromatography plays an important role in the production of biologic drug products. Facilities involved in the production of biologic drug products, or more generally involved in performing chromatography operations, may have columns that are equipped to perform a wide variety of such operations. Different chromatography operations often include the use of different materials and methods—e.g., differing stationary and mobile phases, buffers, washes, eluents, etc.—depending on the purpose of each operation.

Due to differences in chromatography operations, and the need to maintain the integrity, cleanliness, and effectiveness of each chromatography column and operation, it may be desirable to dedicate a single physical chromatography column to a particular operation. However, in some instances, a facility that performs column chromatography may have a catalog, inventory, or schedule of chromatography operations that includes more operations than the number of physical chromatography columns available at the facility. For example, a facility may not have a budget or a physical space large enough to accommodate a dedicated chromatography column for every operation the facility performs. Alternatively, or additionally, a schedule of chromatography operations may grow faster than the facility's ability to acquire new columns. Also, the chromatography operations that a facility performs may vary over time based on, for example, fluctuating needs to purify different molecules or manufacture different products, a need to perform several different chromatography operations to purify a single molecule, or a need to test several different types of chromatography operations. Therefore, it may not be practicable to dedicate a chromatography column to each chromatography operation of a plurality of chromatography operations.

SUMMARY

Some embodiments of the present disclosure are directed to a chromatography column bed support case. The case may include a container having, among other things, a body with an opening, an interior in the body accessible via the opening, and a lid configured to cover the opening. The case may further include two (or more) removable inserts configured to fit inside the interior in a parallel configuration, each insert including a cavity configured to house a chromatography column bed support, and a removable divider disposed between the inserts, wherein the divider may be sized and configured to separate the inserts.

In some embodiments, the inserts and the divider may be sized and configured to extend from one end of the interior to an opposite end of the interior. In some embodiments, each of the inserts and the divider may include two symmetrical indentations positioned diametrically opposite from one another. In further embodiments, the case may include a plurality of spacer pads disposed between a side of one insert and the container. In some embodiments, each of the inserts and the divider may include a centrally located through hole, and the through holes may be coaxial.

In some embodiments, the cavity in each insert may share at least two dimensions with a chromatography column bed support. In some embodiments, each insert may include a recess located at an edge of the cavity, wherein the recess is deeper than the cavity. In some embodiments, the lid may be removably affixed to the container by a securing mechanism. The securing mechanism may include any suitable mechanism now known or later developed, including, but not limited to, a latch, a clasp, a hook-and-eye closure, a tie closure, an elastic closure, or an adhesive. In some embodiments, the container and the dividers include polyethylene.

The present disclosure also includes storage systems comprising a plurality of chromatography column bed support cases, which may be of the same or varying sizes and shapes.

Embodiments of the present disclosure also are directed to a method of storing a chromatography column bed support, the method including placing the chromatography column bed support in a chromatography column bed support case as disclosed herein.

Embodiments of the present disclosure also are directed to a method of dedicating a pair of chromatography column bed supports to a specific chromatography operation. The method may include running a chromatography column according to the specific chromatography operation using the pair of chromatography column bed supports, and after running the chromatography column, storing the pair of chromatography column bed supports in a reusable chromatography column bed support case. The case may include a container having an interior and a lid, two parallel inserts inside the interior, wherein each insert includes a cavity configured to hold one of the pair of chromatography column bed supports, and a divider located or otherwise disposed between the two inserts.

In some embodiments, the pair of chromatography column bed supports may be a first pair of chromatography column bed supports and the specific chromatography operation may be a first specific chromatography operation, and the method may further include running the chromatography column according to a second specific chromatography operation, using a second pair of chromatography column bed supports. In some embodiments, the reusable chromatography column bed support case may be a first reusable chromatography column bed support case, and the method further may include storing the second pair of chromatography column bed supports in a second reusable chromatography column bed support case. In further embodiments, the second pair of chromatography column bed supports and the first pair of chromatography column bed supports may be the same size. In yet further embodiments, the first and/or second specific chromatography operations may be high performance liquid chromatography operations. In some embodiments, the container and divider may be made from polyethylene.

Embodiments of the present disclosure also include a method of managing a plurality of chromatography column bed supports dedicated to specific chromatography operations. The method may include storing each chromatography column bed support in a reusable chromatography column bed support case. The case may include a container having, among other things, an opening, an interior accessible via the opening, and a lid. The case may also include a plurality of inserts arranged in a parallel configuration inside the interior, wherein each insert may include a cavity configured to hold a chromatography column bed support. The case may also include a divider disposed between each of the plurality of inserts. The method may also include, prior to running a chromatography column, removing a chromatography column bed support from the chromatography column bed support case and installing the chromatography column bed support in the chromatography column. In some embodiments, the method also may include storing a plurality of chromatography column bed supports in each of a plurality of reusable chromatography column bed support cases. In some embodiments, the container may include a polyethylene box, and the lid may be attached to the container via a hinge.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. In the drawings:

FIGS. 6A-6C depict views of an insert for a column bed support case, according to aspects of the present disclosure.

DETAILED DESCRIPTION

Figure 1:
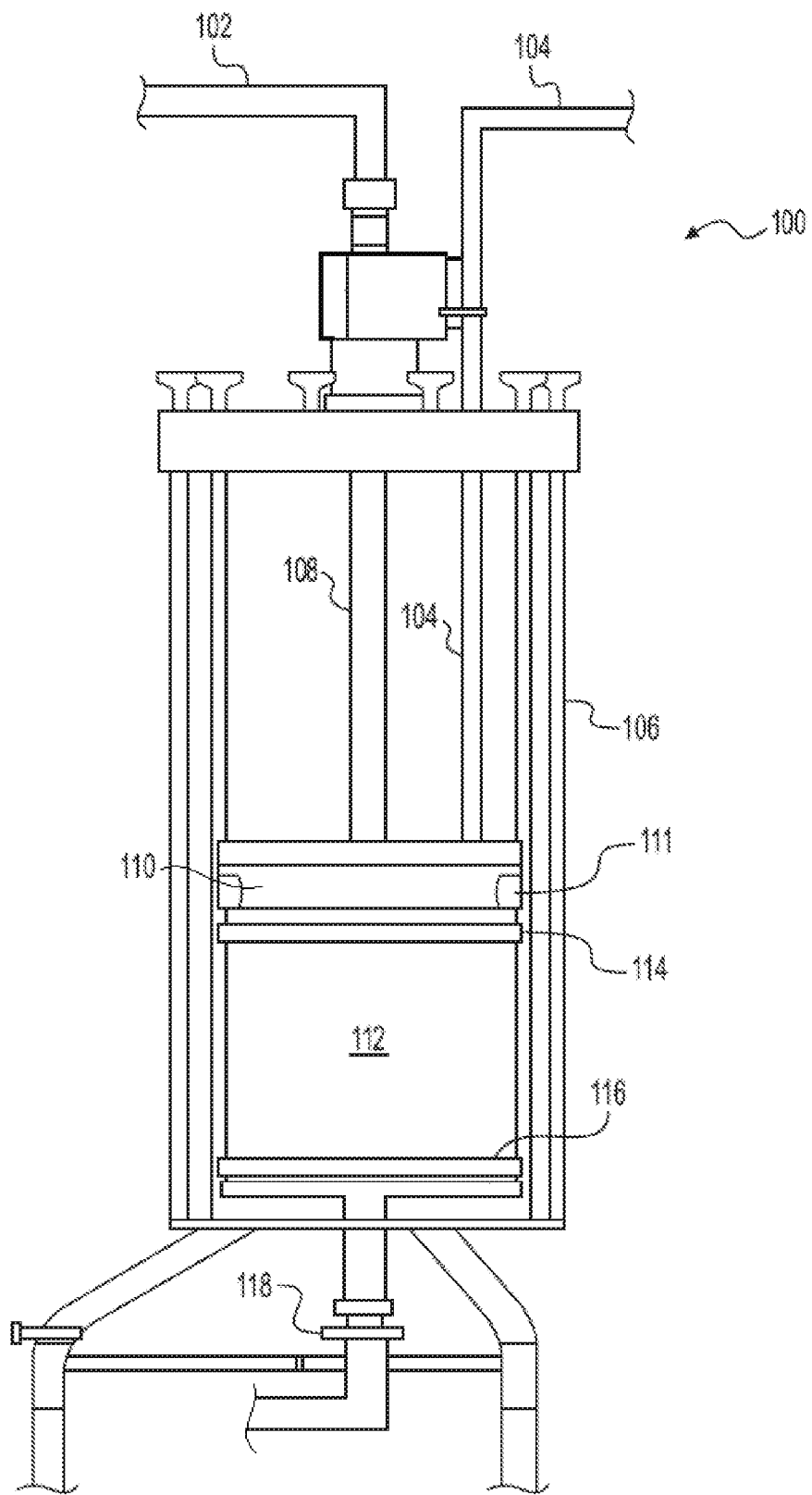
FIG. 1 depicts, in schematic form, an exemplary chromatography column with which various embodiments of the present disclosure may be implemented.

It may be beneficial for a facility that performs multiple chromatography operations to dedicate a given chromatography column, or parts of a chromatography column, to a particular chromatography operation. This may aid in, e.g., minimizing contamination between chromatography operations, reducing the amount of time spent cleaning and sterilizing columns and parts of columns, and the like. In some instances, however, it may not be practicable, possible, or preferable to dedicate an entire chromatography column to a single chromatography operation, due to limitations on budget, limitations on space, or other considerations. As an alternate solution, it may be possible to dedicate one or more chromatography column bed support(s) to a particular chromatography operation by, e.g., using them in combination with the rest of a chromatography column for the particular chromatography operation, and removing them from the column and storing them while the column is needed for a different operation. Dedicating column bed supports to a particular operation in this manner may provide several advantages. For example, a column bed support may be difficult to clean, sterilize, and quantify (e.g., in terms of its surface area) in between different chromatography operations, due to porous or mesh-type surfaces on the column bed support providing a high amount of surface area that may not be easily accessible. By dedicating a column bed support to a particular operation, the risk for cross-contamination of, e.g., stationary phases, mobile phases, washes, buffers, etc. between operations is lessened. Maintaining dedicated column bed supports to a particular operation may be much less wasteful than, e.g., discarding used column bed supports after a particular operation and replacing them with new ones when the column is needed for another operation. Furthermore, in a growing facility, it would be easier to keep a stock of new column bed supports on hand, which may be dedicated to new chromatography operations as they are developed, than it would be to keep or manage a stock of new columns.

Devices, systems, and methods disclosed herein may assist in performing a variety of different chromatography operations using a limited number of chromatography columns. Specifically, devices, systems, and methods disclosed herein may assist in managing, storing, and using dedicated chromatography column bed supports for a plurality of chromatography operations. For example, devices disclosed herein may include cases for storing dedicated column bed supports when they are not in columns. Such devices may be designed and built specifically to ensure efficient, secure storage of column bed supports while minimizing risk of damage or contamination. Systems disclosed herein may include groups of column bed support storage cases, for use in conjunction with a plurality of column bed supports and at least one column. Methods disclosed herein may include performing a particular chromatography operation in a column, removing the column bed supports from the column, storing the column bed supports in a column bed support storage case, and installing another set of column bed supports in the column for another chromatography operation.

Unless otherwise defined, all technical and scientific terms used herein have the same meaning as is commonly understood by one of ordinary skill in the art to which this invention belongs. The materials, methods, and examples are illustrative only and not intended to be limiting. One of ordinary skill in the art will appreciate that routine variations on the disclosed materials, methods, and examples are possible without undue experimentation. All publications, patent applications, patents, and other references mentioned herein are incorporated by reference in their entirety. In case of conflict, the present specification, including definitions, will control.

As used herein, the terms "comprises," "comprising," "includes," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." For such terms, and for the terms "for example" and "such as," and grammatical equivalences thereof, the phrase "and without limitation" is understood to follow unless explicitly stated otherwise. As used herein, the term "about" and the signifier "~" are meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise. Moreover, in the claims, values, limits, and/or other ranges mean the value, limit, and/or range+/− 10%, unless otherwise specified.

As used herein, the term "biologic" may refer to a large molecule (e.g., having a size greater than 30 kDa) created in a living system such as a cell. Biologics may include proteins (e.g., antibodies), nucleic acids, large sugars, etc. Unlike small molecules that may have well-defined chemical structures, biologics may have highly complex structures that cannot be easily quantified by laboratory methods. Thus, it may be desirable to achieve purity, consistency, and quality in the manufacturing of biologics to ensure biologic quality, especially when intended for medical use.

As used herein, the term "drug product" may refer to a volume of a formulated drug substance apportioned into a primary packaging component for packaging, transportation, delivery, and/or administration to a patient. Drug products may include any active ingredients, including, e.g., small molecules or biologics.

For example, in some embodiments, drug products may include a vascular endothelial growth factor (VEGF) derivative. In other aspects, drug products may include aflibercept, which is described in one or more of U.S. Pat. Nos. 7,070,959, 7,303,746, 7,303,747, 7,306,799, 7,374,757, 7,374,758, 7,531,173, 7,608,261, 7,972,598, 8,029,791, 8,092,803, 8,343,737, and 8,647,842, each of which is incorporated by reference herein in its entirety.

In other aspects, drug products may include an antigen-binding molecule. In some aspects, the antigen-binding molecule may be an antibody or antigen-binding fragment. In some aspects, drug products may include alirocumab, which is described in U.S. Patent Application Publication Nos. 2014/0356371 and 2014/035670, each of which is incorporated by reference in its entirety. In another aspect, drug products may include sarilumab, which is described in U.S. Patent Application Publication Nos. 2016/0152717, 2014/0302053, and 2013/0149310, each of which is incorporated by reference in its entirety. In another aspect, drug products may include dupilumab, which is described in U.S. Patent Application Publication No. 2014/0356372, which is incorporated by reference herein in its entirety. In another aspect, drug products may include any molecule selected from the group consisting of evolocumab, bevacizumab, ranibizumab, tocilizumab, certolizumab, etanercept, adalimumab, abatacept, infliximab, rituximab, anakinra, trastuzumab, pegfilgrastim, interferon beta-1a, Insulin glargine [rDNA origin] injection, epoetin alpha, darbepoetin, filigrastim, and golimumab.

As used herein, the terms "chromatography" or "column chromatography" may refer to any preparatory or analytical column chromatography method. While much of the present disclosure is provided in the context of preparatory packed-bed chromatography for purification of a biologic, it is contemplated that the systems and methods disclosed herein may apply to a wide variety of chromatography operations. The terms "chromatography operation," "chromatography process" and "chromatography program" refer to a collection of specific steps and materials employed in a method of using a chromatography column.

As used herein, the term "facility" may refer to any place at which chromatography is performed. For example, a facility may include a manufacturing plant for the production of biologic drug products, a research center, a clinical center, or other laboratory environment.

Reference will now be made in detail to the accompanying drawings. Wherever possible, the same reference numbers will be used throughout the drawings to refer to same or like parts.

FIG. 1 depicts, in schematic form, an exemplary chromatography column 100 with which various embodiments of the present disclosure may be implemented. Column 100 may include a mobile phase supply 102, a material injection supply 104, a column frame 106, a mobile phase conduit 108, a column cover 110, a column body 112, an upper column bed support 114, a lower column bed support 116, and a mobile phase outlet 118.

Column 100 may be part of a chromatography system in a facility. Examples of such a chromatography system may include, e.g., Chromaflow (GE Healthcare) and Axichrom (GE Healthcare). In some instances, column 100 may be a part of a chromatography skid, which may include additional parts, such as a controller, a display, and supplies of mobile phases, washes, and buffers. Column 100 may be configured to perform any of various types of chromatography, such as high performance liquid chromatography (HPLC), ion exchange chromatography, size exclusion chromatography, hydrophobic interaction chromatography (HIC), reverse phase chromatography, mixed-mode chromatography, or affinity chromatography. Column 100 may be used, for example, to separate biologics in a raw mixture, isolate and/or purify a single type of biologic, and/or eliminate contaminants from a mixture. In some instances, column 100 may be a part of a drug product manufacturing system, such as a system for manufacturing a drug product containing a biologic, such as an antibody.

Mobile phase supply 102 may be any suitable supply of a mobile phase to column body 112, via mobile phase conduit 108. Mobile phase supply 102 may be connected to one or more reservoirs to hold mobile phase liquid(s) used to drive raw materials injected by material injection supply 104 into column body 112. Mobile phase supply 102 may include, or be connected to, one or more pumps configured to impart pressure to the mobile phase liquid(s). In some embodiments, pumps connected to mobile phase supply 102 may be configured to mix two or more solvents (e.g., from two or more reservoirs) in a desired ratio prior to supplying the combined solution to mobile phase conduit 108 via mobile phase supply 102. In some embodiments, mobile phase supply 102 may be configured to supply a first mobile phase to column body 112 via mobile phase conduit 108, and then supply a second mobile phase to column body 112 via mobile phase conduit 108 after a desired volume of the first mobile phase has been supplied. Mobile phase supply 102 may be controlled by, for example, a process controller, or by human interaction.

Material injection supply 104 may include any suitable supply of raw material requiring separation and/or purification in column body 112. In some embodiments, material injection supply 104 may include raw materials containing one or more biologics, contaminants, solvents, and/or other materials. In further embodiments, material injection supply 104 may include one or more drug products, or one or more materials used in the manufacture of a drug product. In some embodiments, material injection supply 104 may include one or more reservoirs to hold materials to be separated and/or purified in column body 112.

Column frame 106 may be sized and configured to accommodate and support one or more of mobile phase supply 102, material injection supply 104, mobile phase conduit 108, column cover 110, column body 112, upper column bed support 114, lower column bed support 116, and mobile phase outlet 118. In some embodiments, column frame 106 may include a series of adjustable struts arranged in a generally cylindrical manner, forming an open housing around column body 112. Column frame 106 may be configured to be assembled and disassembled, either fully or partially, such that other parts of column 100 may be removed, cleaned, and/or replaced. Column frame 106 may, in some embodiments, include wheels or other mobile attributes to allow for portability.

Mobile phase conduit 108 may be fluidly connected to mobile phase supply 102, column body 112, and/or column cover 110, such that fluid provided through mobile phase supply 102 may pass through mobile phase conduit to column body 112. Such a fluid connection may include, for example, a coupling (e.g., a threaded coupling), one or more gaskets or other seals, etc. In some embodiments, mobile phase conduit 108 may be of adjustable length, to accommodate a variety of column heights in column frame 106.

Column cover 110 may cover a top of column body 112, and may include one or more features to close and/or otherwise protect an upper end or upper portion of column body 112. For example, column cover 110 may include an adjustable seal, such as a gasket seal, to seal itself to a perimeter of the upper end or upper portion of column body 112 when column 100 is assembled. Column cover 110 may include an opening through which mobile phase conduit 108 may deliver mobile phase from mobile phase supply 102 to column body 112. In some embodiments, column cover 110 may include one or more fixation elements with which to hold upper column bed support 114 in place at or near an upper end of column body 112, underneath column cover 110.

Column body 112 may be any column body suitable for installation in column frame 106. Column body 112 may be configured for assembly together with upper column bed support 114 and/or lower column bed support 116 in column frame 106, and may be packed with a stationary phase suitable for a chromatography operation. One of ordinary skill in the art will recognize that column body 112 may have any of a wide variety of sizes (e.g., diameters ranging from about 30 cm to about 1500 cm) and may be packed with any of a wide variety of stationary phases. The size, shape, and pack of column body 112 may be chosen in view of various factors, including the composition, volume, chemical properties, mechanical properties, charge, pH, and/or other characteristics of the material in material supply 104, as well as the desired outcome of the chromatography run.

Upper column bed support 114 and lower column bed support 116 may be sized and configured to fit above and below a pack in column body 112. Upper column bed support 114 and lower column bed support 116 may have several functions, including containment of the stationary phase, ensuring that the stationary phase moves or shifts minimally, and/or filtration of fluid progressing through column body 112. Both column bed supports may include a porous or mesh component through which fluid (e.g., a mobile phase) may pass. A size of the apertures in the porous or mesh components of both column bed supports may be sufficiently large to allow for passage of a mobile phase, while also being small enough to prevent migration of a stationary phase in a chromatography run. Either or both of the column bed supports may be made of any suitable material, such as a metal, metal alloy, or a polymer. For example, column bed supports may be made from steel, nickel, and/or titanium. Both upper column bed support 114 and lower column bed support 116 may have dimensions (e.g., a length and width, or a diameter) compatible with column body 112, to aid in maintaining the position and integrity of a stationary phase in column body 112. In some embodiments, upper column bed support 114 may be sized and configured to fit snugly within column body 112, and lower column bed support 116 may be sized and configured to share a diameter with column body 112, such that it may close a lower end of column body 112. Each column bed support 114, 116 may also have a depth or thickness suitable for providing physical support to a packed column, while still allowing for passage of a mobile phase. In some embodiments, upper column bed support 114 and lower column bed support 116 may be generally disk-shaped. One exemplary brand of column bed supports with which this disclosure may be used is AxiChrom®, distributed by GE Healthcare Life Sciences.

Mobile phase outlet 118 may be fluidly connected to an opening at a lower end of column body 112, below lower column bed support 116. While running a chromatography operation, mobile phase outlet 118 may also be fluidly connected to, e.g., a collector. In some embodiments, one or more detectors may be positioned so as to detect one or more characteristics of fluid exiting the column.

Figure 2A:
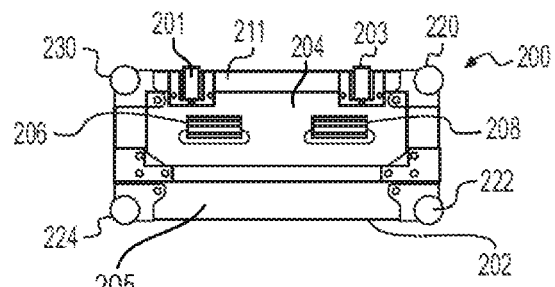
FIGS. 2A-2E depict, in schematic form, an exemplary column bed support case, according to aspects of the present disclosure.
Figure 2B:
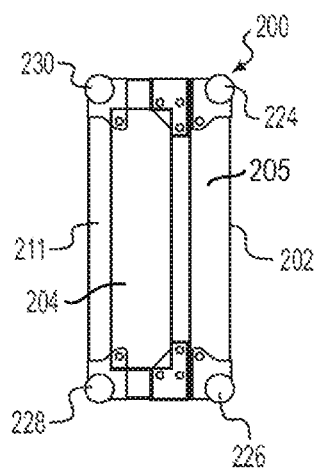
Figure 2C:
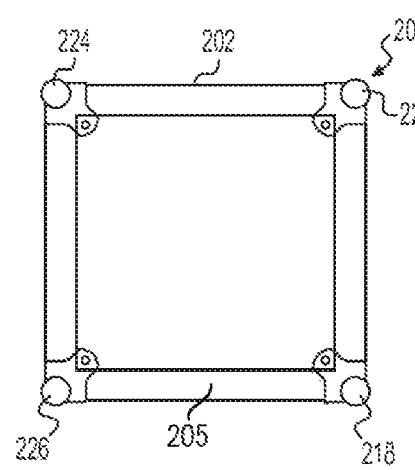
Figure 2D:
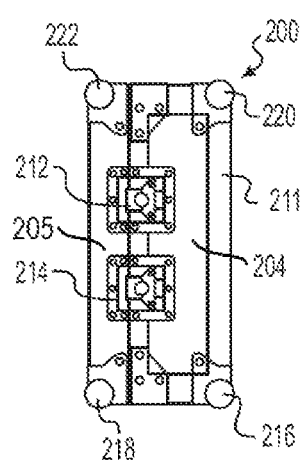
Figure 2E:
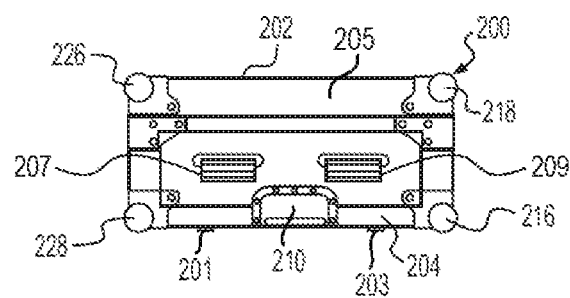

FIGS. 2A-2E depict, in schematic form, an exemplary column bed support case 200, according to aspects of the present disclosure. FIG. 2A depicts a top view, FIG. 2B depicts a first side view, FIG. 2C depicts a front view, FIG. 2D depicts a second side view, and FIG. 2E depicts a bottom view of the case 200. Case 200 includes an openable front 202, a case body 204, a plurality of external handles 206, 207, 208, 209, an inset handle 210, latches 212, 214, standoffs 201, 203, reinforcement bands 205, 211, and corner guards 216, 218, 220, 222, 224, 226, 228, 230.

Case 200 may be of any shape or size suitable for housing one or more column bed supports (e.g., upper column bed support 114 and/or lower column bed support 116). For example, case 200 may be of a size and shape suitable for housing one or more column bed supports having a diameter of between about 20 cm and about 150 cm, such as about 30 cm, about 40 cm, about 50 cm, about 60 cm, about 70 cm, about 80 cm, about 90 cm, about 100 cm, about 110 cm, about 120 cm, about 130 cm, about 140 cm, or about 150 cm. These sizes are exemplary, and case 200 may be of a size and shape suitable for housing one or more column bed supports having dimensions smaller than about 20 cm or larger than about 150 cm. In some embodiments, case 200 may be a rectangular box having a length, a width, and a depth that is less than the length and the width. As depicted in FIGS. 2A-2E, case 200 may have a length and width that form a square, such that an interior of case 200 may accommodate disk-shaped column bed supports. Case 200 may also include a depth that is less than the length and the width, to correspond with the relatively flat shape of the disk-like column bed supports. In alternative embodiments, case 200 may have a length longer than its width or depth, or may have other shapes, such as a cylindrical shape (e.g., with a circular cross-section).

A table of exemplary external dimensions suitable for case 200 is presented below.

TABLE 1

| Compatible column bed support size (approx. diameter (cm) as identified by manufacturer) | Case Length (cm) | Case Width (cm) | Case Depth (cm) |
|---|---|---|---|
| 40 | 54.61 | 54.61 | 24.77 |
| 60 | 74.93 | 74.93 | 24.77 |
| 80 | 95.25 | 95.25 | 24.77 |

As can be seen from Table 1, the depth of case 200 may not necessarily change along with the compatible column bed support, because a column bed support's thickness may not necessarily increase with its diameter. However, case 200's length and width may be tailored specifically to fit the case's compatible column bed support size.

Case 200 may have an exterior housing divided into an openable front 202 and a case body 204. Openable front 202 may have a length and a width equivalent to the length and width of the case, such that it includes an entire front side of case 200 (e.g., the side depicted in FIG. 2C). Openable front 202 may be affixed to case body 204 by a number of methods, such as by latches 212, 214 on one side of case 200. In some embodiments, openable front 202 and case body 204 may be movably affixed to one another by one or more hinges on a side of case 200 opposite latches 212, 214. In alternative embodiments, case 200 may include an openable side having a length and a width equivalent to the length and depth of the case, such that the openable side of case 200 is one of the narrower sides of case 200. In such embodiments, the openable side of case 200 and the case body may still be removably and/or movably affixed to one another via latches 212, 214 and/or one or more hinges located at a juncture between the openable side and the case body of case 200.

Case 200 may be made from any material that is strong and stiff enough to maintain its shape and prevent or reduce damage to the case's contents. For example, case 200 may be made from a hard plastic, a metal, or a combination of plastic and metal. In some embodiments, case 200 may be made from a waterproof or water-resistant material. In some embodiments, case 200 may be made from a material having little or low toxicity, e.g., as determined by a regulatory or manufacturing standard. In some embodiments, the material may be manufactured according to one or more regulatory standards, such as standards set by the United States Pharmacopeia (USP). For example, in some embodiments, the material may be a USP Class VI material. In some embodiments, case 200 may be made from a polyethylene material, such as a low density polyethylene material (e.g., LD45). In alternative embodiments, case 200 may be made from a metal, such as aluminum, steel, titanium, nickel, and/or an alloy of one or more of these metals. In still further embodiments, case 200 may be made from a combination of metal and polyethylene, such as a polyethylene-coated metal.

The housing of case 200 (including openable front 202 and case body 204) may have an approximately uniform overall thickness. For example, if case 200 is made from low-density polyethylene (e.g., LD45), the housing of case 200 may have an approximately uniform thickness ranging from about 1.0 cm to about 4.0 cm, such as from about 1.0 cm to about 3.0 cm, or from about 1.2 cm to about 2.0 cm. For example, the housing of case 200 may have an approximately uniform thickness of about 1.0 cm, about 1.1 cm, about 1.25 cm, about 1.3 cm, about 1.35 cm, about 1.4 cm, about 1.5 cm, or about 1.6 cm.

External handles 206, 207, 208, 209 may be located on one or more sides of case 200. As depicted, external handles 206, 207, 208, 209 may be located in pairs on opposing sides of case 200, and may be sized and configured to allow for a user to pick up and carry case 200. External handles 206, 207, 208, 209 may be any handles suitable for carrying, such as square handles, rounded handles, loops, rotatable hinged handles, collapsible handles, and the like. They may be made from any suitably strong material, such as a polymer or a metal material. In some embodiments, they may be made from a low-density polyethylene material. In further embodiments, they made be made from steel, nickel, aluminum, titanium, or an alloy including one or more of these metals. In some embodiments, external handles 206, 207, 208, 209 may be reinforced, or covered to allow for comfort while in use. For example, in some embodiments, external handles 206, 207, 208, 209 may be made from a metal fully or partially covered in a polymer sleeve or coating.

Inset handle 210 may be formed from an aperture at the edge of, e.g., a side of case 200, such as the bottom side of case 200 depicted in FIG. 2E. In alternative embodiments, inset handle 210 may be formed at the edge of any side of case 200. Inset handle 210 may be sized and configured to allow for a hand to grab and hold case 200 and, for example, pull or lift case 200. In some embodiments, inset handle 210 may be formed from apertures in two intersecting sides of case 200 (e.g., a bottom side of case 200, depicted in FIG. 2E, and a back side of case 200), to form a cavity in case 200. In some embodiments, a case (e.g., case 200) may include more than one inset handle, e.g., on opposite or adjacent sides of case 200. In some embodiments, edges of inset handle 210 may be strengthened and reinforced by an added border of material. Such reinforcing material may be affixed to case 200 by, e.g., any suitable material, such as an adhesive (e.g., a glue), one or more screws, grommets, or rivets, a welded connection, or a combination of any of these methods.

Standoffs, such as standoffs 201, 203, may be located on one or more sides of case 200, and may be affixed to case 200, reinforcement bands on case 200, or both. Standoffs 201, 203 may be sized and configured to support case 200 away from, e.g., a surface on which case 200 is resting, or a surface adjacent to case 200. Standoffs 201, 203 are depicted as being evenly spaced on an edge of the top side of case 200. In alternative embodiments, standoffs may be placed on any number of sides of case 200, in any number.

Reinforcement bands, such as reinforcement bands 205, 211 may be affixed on or around one or more edges of case 200. Such reinforcement bands may serve to enhance the durability of case 200 by, for example, protecting the edges and corners of case 200 from wear and tear. As depicted in FIGS. 2A-2E, reinforcement bands such as bands 205, 211 may be present on every angled edge of cage 200. In alternative embodiments, reinforcement bands may be present only on some edges. in yet further embodiments, reinforcement bands may not be present at all.

Corner guards 216, 218, 220, 222, 224, 226, 228, 230 may be affixed on corners of case 200 (e.g., where more than two sides of case 200 meet in a point. Such corner guards may assist in protecting case 200, users handling case 200, and environments in which case 200 is handled, from damaging and/or being damaged by one another. The corner guards may also facilitate movement of case 200 by making it easier to slide case 200 along a surface.

As depicted in FIGS. 2A-2E, a side of openable front 202 is removably affixed to case body 204 by latches 212, 214. Latches 212, 214 may be any suitable latches or catches known in the art, such as compression spring latches, twist latches, padlockable latches, draw latches, venting latches, keeper latches, long catch latches, and the like. Openable front 202 may be movably affixed to case body 204 by one or more hinges on a side of case 200 opposite latches 212, 214. In other embodiments, openable front 202 may be affixed to case body 204 by latches or catches on two or more sides of case 200, in lieu of or in addition to hinges. In further alternative embodiments, openable front 202 may be affixed to case body 204 by any other suitable method, such as by one or more clips, tie-closures, elastic closures, straps, buckles, clasps, zippers, buttons, and the like.

Elements of case 200, such as some or all of handles 206, 207, 208, 209, latches 212, 214, corner guards 216, 218, 220, 222, 224, 226, 228, 230, reinforcement bands 205, 211, standoffs 201, 203, and the reinforced border of inset handle 210, may be made from any of a variety of suitable materials. Suitable materials may include, for example, metals, such as aluminum, steel, titanium, nickel, or alloys of such metals. Suitable materials may also include polymers and co-polymers of sufficient hardness and strength to maintain their structure and perform their function (e.g., a low density polyethylene, such as LD45). In some embodiments, one or more of these elements may be made from a polymer-covered or polymer-coated metal or metal alloy.

Elements of case 200, such as handles 206, 207, 208, 209, latches 212, 214, corner guards 216, 218, 220, 222, 224, 226, 228, 230, reinforcement bands 205, 211, standoffs 201, 203, and the reinforced edges of inset handle 210, may be affixed to case 200 and/or to one another by any suitably strong methods that allows for safe, reusable use of case 200. For example, handles 206, 207, 208, 209 may be affixed to case 200 by a method that allows for case 200 to be carried by the handles. For example, elements on the exterior of case 200 may be affixed to case 200 by an adhesive (e.g., a glue), one or more screws, rivets, or grommets, a welded connection, or a combination of any of these methods.

While case 200 is depicted in FIGS. 2A-2E as having several features, such as handles 206, 207, 208, 209, latches 212, 214, corner guards 216, 218, 220, 222, 224, 226, 228, 230, reinforcement bands 205, 211, standoffs 201, 203, and inset handle 210, it is contemplated that a case according to the present disclosure may not necessarily have one or more of these features. For example, a case according to the present disclosure may not include handles or corner guards. As another example, a case according to the present disclosure may not include reinforcement bands (e.g., reinforcement bands 205, 211), or standoffs (e.g., standoffs 201, 203).

Figure 3:
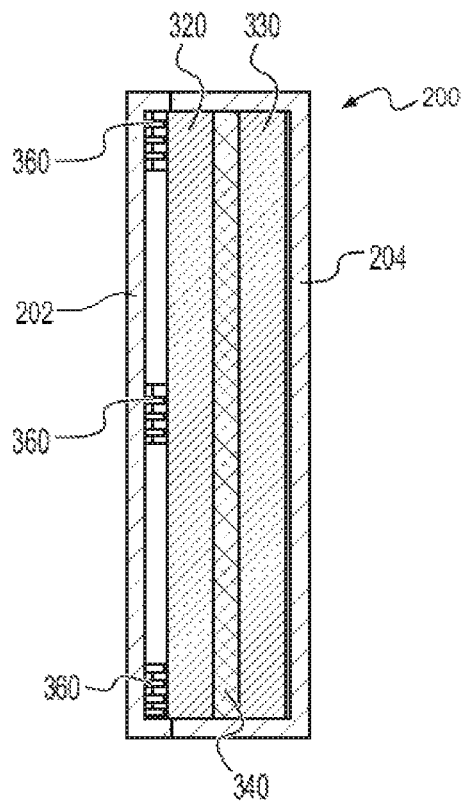
FIG. 3 depicts, in schematic form, a cross-sectional view of a column bed support case and its interior, according to aspects of the present disclosure.

FIG. 3 depicts a cross-sectional view of an exemplary interior of case 200, according to aspects of the present disclosure. The viewing angle of case 200 shown in FIG. 3 is the same as that shown in FIG. 2D. As shown in FIG. 3, case body 204 and openable front 202 may enclose a plurality of stacked contents, including inserts 320, 330 separated by divider 340. Insert 320 may be spaced from openable front 202 by three spacers 360.

As depicted in FIG. 3, case 200 may be sized and configured to snugly fit one or more inserts and dividers. For example, case 200 may be sized and configured to fit approximately square inserts and dividers which are, in turn, sized and configured to house circular disk-shaped column bed supports.

Each of inserts 320, 330 may be configured to hold a column bed support. Divider 340 may be configured to provide separation and padding between inserts 320, 330, as well as between the column bed supports that they may hold. Spacers 360 may be configured to provide separation, padding, and filling between one (or both) of the inserts and the housing of case 200. As shown in FIG. 3, a combined depth of these contents of case 200 is approximately equal to the depth of the interior of case 200. This snug stacking of contents of case 200 may assist in minimizing the potential for damage to column bed supports due to jostling, transportation, or other movement of case 200. While a specific organization of inserts, dividers, and spacers is shown in case 200 in FIG. 3, it is contemplated that inserts, dividers, and spacers could be arranged in other orders. For example, a divider may be placed in between an insert (e.g., insert 330) and an interior of case 200. In some embodiments, a divider may be placed on each side of each insert, e.g., to provide additional protection to the column bed support housed in each insert. As another example, case 200 may be sized and configured to hold only one insert. As a further example, case 200 may be sized and configured to hold more than two inserts, e.g., 4, 6, 8, or 10 inserts.

Each of the components inside case 200, depicted in FIG. 3, is described in further detail below.

Figure 4A:
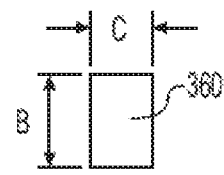
FIGS. 4A and 4B depict views of an insert for the column bed support case, according to aspects of the present disclosure.
Figure 4B:
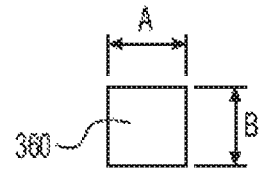

FIGS. 4A and 4B depict two views of a rectangular spacer (e.g., spacers 360) for use in a column bed support case (e.g., case 200) according to aspects of the present disclosure. As shown, spacer 360 may be a block positioned between the interior of a case (e.g., case 200) and an insert (e.g., insert 320 or insert 330). Spacer 360 may have a smaller length and width than the inserts 320, 330 and divider 340. Spacer 360 may be removable, or may be affixed to, e.g., an interior of the case (e.g., case 200) by, e.g., an adhesive or any of the other fixation methods disclosed herein. Spacer 360 may be specifically sized to fill whatever depth is empty in case 200, so as to prevent inserts 320, 330 and divider 340 from shifting within case 200 and potentially dislodging column bed supports held in inserts 320, 330. Any number of spacers 360 may be present inside case 200 in order to assist in immobilizing inserts 320, 330. For example, case 200 may include two, four, six, or eight spacers 360.

Figure 5A:
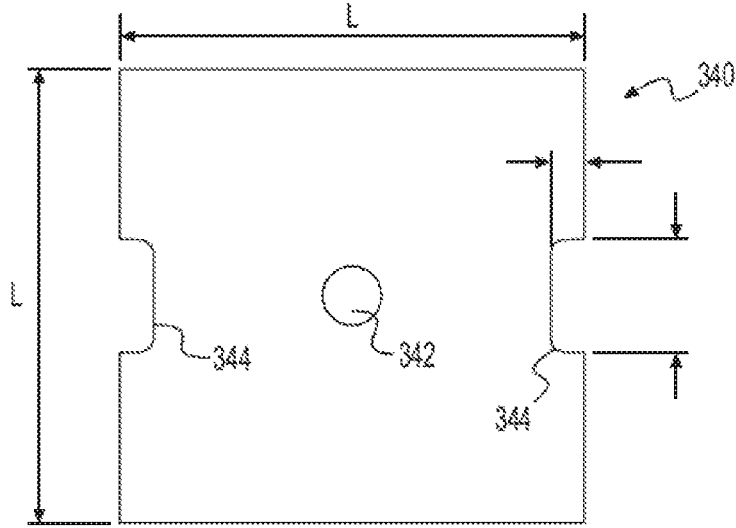
FIGS. 5A and 5B depict views of a divider for a column bed support case, according to aspects of the present disclosure.
Figure 5B:
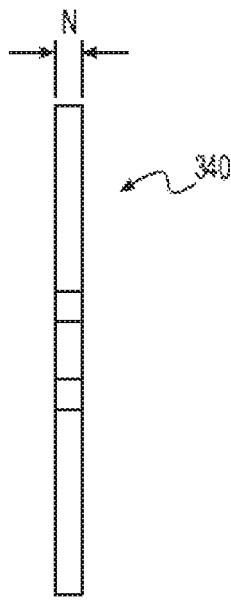

FIGS. 5A and 5B depict views of a divider (e.g., divider 340) for a column bed support case according to aspects of the present disclosure. Divider 340 may extend across a length and width of an interior of case 200, and may be positioned in between inserts (e.g., inserts 320, 330) in case 200. Divider 340 may serve to prevent inserts in case 200 from shifting, falling, hitting one another or jostling one another. Handle indentations 344 may be located on one or more sides of divider 340, and may assist with picking up and moving divider 340. In some embodiments, each side of divider 340 may include a handle indentation 344. Divider 340 may also include a through hole 342. A dowel or other device may be placed into through hole 342 in order to prevent divider 340 from shifting or moving against, e.g., inserts 320, 330. In some embodiments, divider 340 may cover a majority of an area between inserts 320, 330. In other embodiments, divider 340 may have a smaller surface area. It is contemplated that divider 340 may have any shape or size that will fit in case 200 and that will separate two or more inserts from one another, or that will separate an insert from an interior wall of a case (e.g., case 200). For example, divider 340 may be circular, X-shaped, cross-shaped, or grid shaped.

Divider 340 may be made from any material that is strong and stiff enough to maintain its shape and maintain separation between an insert and other portions or components of case 200. For example, divider 340 may be made from a hard plastic, a metal, or a combination of plastic and metal. In some embodiments, divider 340 may be made from a waterproof or water-resistant material. In some embodiments, divider 340 may be made from a material having little or low toxicity, e.g., as determined by a regulatory or manufacturing standard. In some embodiments, the material may be manufactured according to one or more regulatory standards, such as standards set by the United States Pharmacopeia (USP). For example, in some embodiments, the material may be a USP Class VI material. In some embodiments, divider 340 may be made from a polyethylene material, such as a low density polyethylene material (e.g., LD45). In other embodiments, divider 340 may be made from one or more other polymers, such as acrylonitrile butadiene styrene (ABS). In alternative embodiments, divider 340 may be made from a metal, such as aluminum, steel, titanium, nickel, and/or an alloy of one or more of these metals. In still further embodiments, divider 340 may be made from a combination of metal and polymer, such as a polymer-coated metal.

FIGS. 6A-6C depict views of an insert (e.g., insert 320) for a column bed support case according to aspects of the present disclosure. Insert 320 may include a cavity 322, one or more recesses 324 around a perimeter of cavity 322, a through hole 326, and one or more handle indentations 328. Insert 320 may be sized and configured to house a particular size and/or type of column bed support in cavity 322. For example, in some embodiments, insert 320 may be sized and configured to house one of a pair of column bed supports, such as an upper column bed support (e.g., upper column bed support 114 depicted in FIG. 1)

Figure 7B:
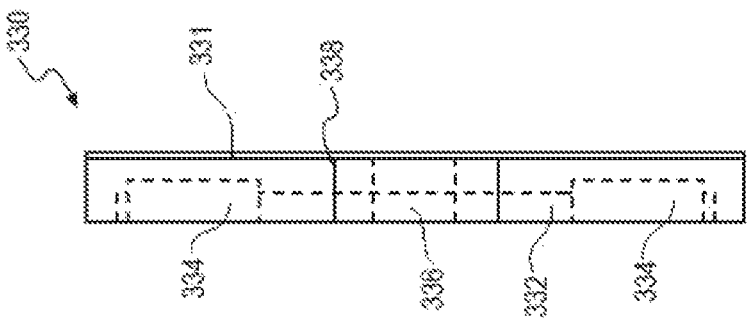
FIGS. 7A-7C depict views of another insert for a column bed support case, according to aspects of the present disclosure.
Figure 7A:
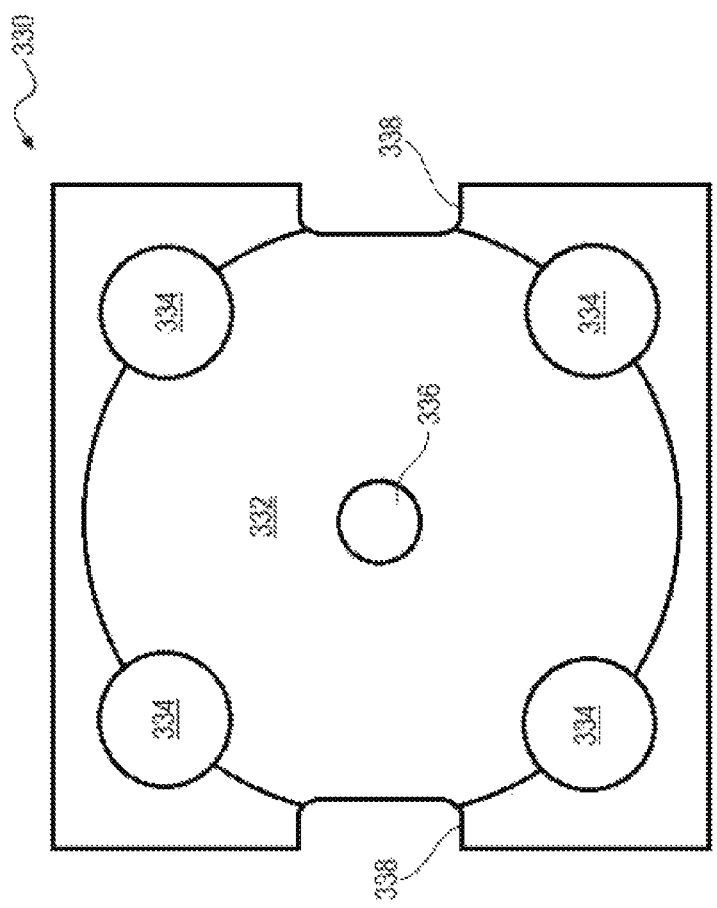
Figure 7C:
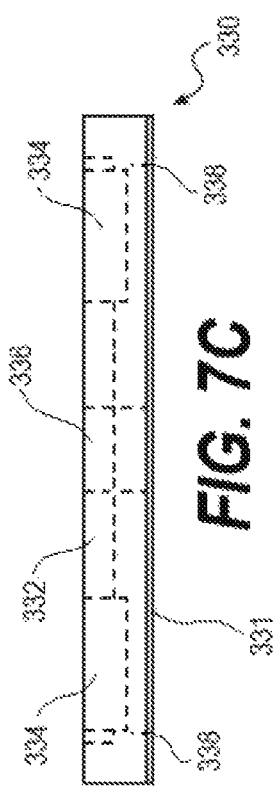

FIGS. 7A-7C depict views of a second insert (e.g., insert 330) for a column bed support case, according to aspects of the present disclosure. Like insert 320, insert 330 may include a cavity 332, one or more recesses 324 around a perimeter of cavity 332, a through hole 336, and one or more handle indentations 338. In some embodiments, insert 330 may be sized and configured to fit a column bed support that forms a pair with a column bed support to be housed in insert 320. For example, if insert 320 is sized and configured to house a top column bed support for a given size of chromatography column, then insert 330 may be sized and configured to hold a bottom column bed support for the same size of chromatography column. Insert 330 may therefore have a cavity 332 that is larger than cavity 322 of insert 320. In some embodiments, and as depicted in FIGS. 7A-7C, cavity 332 may be large enough to partially extend into handle indentations 338.

Cavities 322, 332 may extend partially into inserts 320, 330, and may have dimensions (e.g., a diameter, depth, volume, etc.) tailored to house one column bed support each. As depicted, cavities 322, 332 may have generally circular cross-sections and may be generally cylindrical in shape; however, it is contemplated that they may have any shape tailored to house a column bed support. In some embodiments, cavities 322, 332 may have dimensions similar to those of the column bed supports that they are intended to house, so that column bed supports stored in cavities 322, 332 do not have excessive space to shift, knock against other components inside case 320, and/or become damaged or contaminated.

Recesses 324, 334 may be located around the perimeter of cavities 322, 332, respectively. As depicted in FIGS. 6A-6C and FIGS. 7A-7C, recesses 324, 334 may extend into inserts 320, 330 in the same direction as cavities 322, 332, but may extend slightly further than cavities 322, 332. Recesses 324, 334 may be sized and configured to allow for placement and removal of column bed supports into cavities 322, 332. As such, recesses 324, 334 may be of any size and configuration suitable for sliding hands, fingers, or other tools next to and underneath column bed supports housed in cavities 322, 332. Although recesses 324, 334 are depicted as having general cylindrical shapes with circular cross sections, it is contemplated that recesses 324, 334 may have other shapes, such as oblong or rectangular shapes. Although four recess 324, 334 are depicted in the figure, those of ordinary skill in the art will readily recognize that a greater or lesser number of recesses may be provided on inserts 320, 330.

Inserts 320, 330 may include through holes 326, 336. As with through hole 342 in divider 340, a dowel or other device may be placed into through holes 326, 336 in order to prevent inserts 320, 330 from shifting or moving inside case 200. This may be suitable in cases where column bed supports housed in inserts 320, 330 also include through holes, such that a single dowel, bar, or other device may be threaded through each of inserts 320, 330, divider 340, and column bed supports housed in inserts 320, 330.

As with handle indentations 344 of divider 340, handle indentations 328, 338 may be located on one or more sides of each of inserts 320, 330, and may assist with picking up and moving each insert. In some embodiments, each side of an insert 320, 330 may include a handle indentation 328, 338, respectively. Although handle indentations 328, 338, 344 are depicted as having a generally rectangular shape with curved corners, each handle indentation may have any size and shape suitable for hands, fingers, or tools to grasp and lift each of divider 340, insert 320, and insert 330. As depicted, a cavity (e.g., cavity 332) may extend into a handle indentation (e.g., handle indentation 338) without overly disrupting the structure and/or function of either the cavity or the handle indentation.

Inserts 320, 330 may be made from any non toxic material suitable for housing a column bed support. In some embodiments, for example, inserts 320, 330 may be made from a material having little or low toxicity, e.g., as determined by a regulatory or manufacturing standard. In some embodiments, the material may be manufactured according to one or more regulatory standards, such as standards set by the United States Pharmacopeia (USP). For example, in some embodiments, the material may be a USP Class VI material. In some embodiments, inserts 320, 330 may be made from a polyethylene material, such as a low density polyethylene material (e.g., LD45). In other embodiments, inserts 320, 330 may be made from one or more other polymers, such as acrylonitrile butadiene styrene (ABS). In further embodiments, and as depicted in FIGS. 6A-6C and 7A-7C, inserts 320, 330 may have a body made from one material, with a reinforcing back layer 321, 331 of a second material. For example, inserts 320, 330 may be made primarily from a low density polyethylene, such as LD45, or other plastic or foam material, and may also include a reinforcing back layer (layers 321, 331, respectively) made from a harder material, such as a hard polymer (e.g., ADS) or metal. In alternative embodiments, some or all of inserts 320, 330 may be made from foam, metal (e.g., aluminum, steel, titanium, nickel, and/or an alloy of one or more of these metals), or a combination of metal and polymer, such as a polymer coated metal. In still further embodiments, divider 340 may be made from a combination of metal and polymer, such as a polymer-coated metal.

As alluded to above, the dimensions of an interior of case 200, spacers 360, inserts 320, 330, and divider 340 may be sized and configured to snugly hold column bed supports of a specific size and shape. Table 2 below lists three exemplary sets of dimensions for these components, given each of three column bed support sizes (e.g., an approximate diameter of a column bed support, as identified by the column bed support manufacturer).

TABLE 2

| All dimensions are approximate, and are presented in cm. | |
| --- | --- |
| Column bed support size (approx. diameter as identified by manufacturer) | 40 |
| External case 200 length | 54.61 |
| External case 200 width | 54.61 |
| External case 200 depth | 24.77 |
| Spacer 360 length and width | 10.16 |
| Spacer 360 depth | 6.83 |
| Length of insert 320, insert 330, divider 340 | 50.80 |
| Width of insert 320, insert 330, divider 340 | 50.80 |
| Depth of divider 340 | 2.54 |
| Depth of inserts 320, 330 | 5.41 |
| Thickness of reinforced layers 321, 331 | 0.33 |
| Diameter of cavity 322 | 39.70 |
| Diameter of cavity 332 | 45.72 |
| Depth of cavities 322, 332 | 2.24 |
| Diameter of recesses 324, 334 | 10.16 |
| Depth of recesses 324, 334 | 3.18 |
| Diameter of through holes 342, 326, 336 | 6.35 |
| Length of handle indentations 344, 328, 338 | 12.70 |
| Width of handle indentations 344, 328, 338 | 3.81 |
| Column bed support size (approx. diameter as identified by manufacturer) | 60 |
| External Case 200 Length (cm) | 74.93 |
| External Case 200 Width (cm) | 74.93 |
| External Case 200 Depth (cm) | 24.77 |
| Spacer 360 length and width | 10.16 |
| Spacer 360 depth | 4.29 |
| Length of insert 320, insert 330, divider 340 | 71.12 |
| Width of insert 320, insert 330, divider 340 | 70.80 |
| Depth of divider 340 | 2.54 |
| Depth of inserts 320, 330 | 5.41 |
| Thickness of reinforced layers 321, 331 | 0.33 |
| Diameter of cavity 322 | 59.09 |
| Diameter of cavity 332 | 66.68 |
| Depth of cavities 322, 332 | 2.24 |
| Diameter of recesses 324, 334 | 10.16 |
| Depth of recesses 324, 334 | 3.18 |
| Diameter of through holes 342, 326, 336 | 6.35 |
| Length of handle indentations 344, 328, 338 | 12.70 |
| Width of handle indentations 344, 328, 338 | 3.81 |
| Column bed support size (approx. diameter as identified by manufacturer) | 80 |
| External Case 200 Length (cm) | 95.25 |
| External Case 200 Width (cm) | 95.25 |
| External Case 200 Depth (cm) | 24.77 |
| Spacer 360 length and width | 10.16 |
| Spacer 360 depth | 4.29 |
| Length of insert 320, insert 330, divider 340 | 91.44 |
| Width of insert 320, insert 330, divider 340 | 91.44 |
| Depth of divider 340 | 2.54 |
| Depth of inserts 320, 330 | 5.41 |
| Thickness of reinforced layers 321, 331 | 0.33 |
| Diameter of cavity 322 | 80.01 |
| Diameter of cavity 332 | 86.36 |
| Depth of cavities 322, 332 | 2.24 |
| Diameter of recesses 324, 334 | 10.16 |
| Depth of recesses 324, 334 | 3.18 |
| Diameter of through holes 342, 326, 336 | 6.35 |
| Length of handle indentations 344, 328, 338 | 12.70 |
| Width of handle indentations 344, 328, 338 | 3.81 |

Tolerances (e.g., manufacturing tolerances) for the above dimensions may be as follows:

TABLE 3

| Dimension range | Tolerance |
| --- | --- |
| 0.00-30.48 | +/−0.15 |
| 30.48-60.96 | +/−0.23 |

TABLE 3-continued

| Dimension range | Tolerance |
| --- | --- |
| 60.96-91.44 | +/−0.48 |
| 91.44-152.40 | +/−0.65 |

The above dimensions are only exemplary, and many other combinations of dimensions may be appropriate for a case, such as case 200, or variations thereof, and its components.

Figure 8:
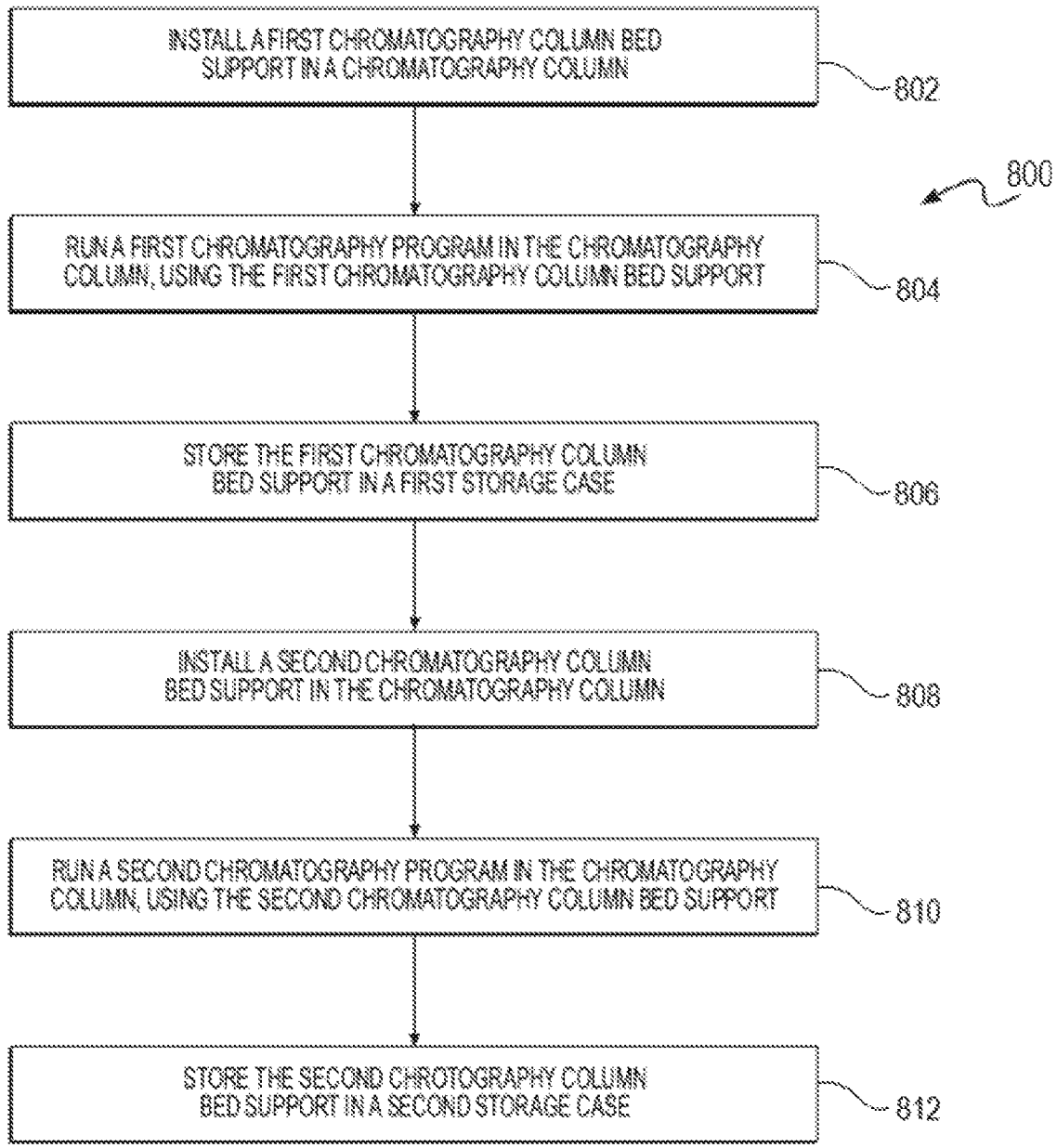
FIG. 8 depicts, in flow chart form, steps in a method of managing dedicated column bed supports, according to aspects of the present disclosure.

FIG. 8 depicts, in flow chart form, steps in a method 800 of managing dedicated column bed supports, according to aspects of the present disclosure. According to step 802, a first chromatography column bed support may be installed in a chromatography column. According to step 804, a first operation may be run in the chromatography column, using the first column bed support. According to step 806, the first column bed support may be stored in a first storage case. According to step 808, a second column bed support may be installed in the chromatography column. According to step 810, a second chromatography operation may be run in the chromatography column, using the second chromatography column bed support. According to step 812, the second chromatography column bed support may be stored in a second storage case. Steps 812 may be repeated additional times, e.g., with the first operation and first column bed support and the second operation and second column bed support, and/or with third, fourth, fifth, or additional operations, and with third, fourth, fifth, or additional column bed supports.

According to step 802, a first chromatography column bed support may be installed in a chromatography column. This may be accomplished according to a number of established practices and procedures. For example a first column bed support 116 may be installed in, e.g., column body 112. In some embodiments, the first chromatography column bed support may be a new column bed support. In other embodiments, the first column bed support may have been used previously for, e.g., an established chromatography operation. In some embodiments, a pair of first chromatography column bed supports, such as an upper column bed support 114 and a lower column bed support 116, may be installed in a chromatography column.

According to step 804, a first operation may be run in the chromatography column, using the first column bed support (or pair of first column bed supports). The first operation may include, for example, a chromatography operation requiring the use of the first chromatography column bed support (or a first pair of chromatography column bed supports). The first operation may also require a specific column pack (e.g., a particular stationary phase), a specific mobile phase, and/or a specific series of washes and/or buffers. In some embodiments, the first operation may be configured to be run as a part of a manufacturing process for a drug product. In further embodiments, the first operation may be configured to be run as a part of a testing protocol.

According to step 806, the first column bed support (or pair of column bed supports) may be removed from the chromatography column and stored in a first storage case (e.g., case 200). In some embodiments, this step may include unpacking and cleaning the chromatography column. In some embodiments, for example, this may be performed after one or more iterations of the first chromatography operation is run. In some embodiments, the first column bed support or pair of column bed supports may be cleaned or sterilized prior to being stored in a first storage case. In some embodiments, the first storage case may be labeled or otherwise marked as a dedicated storage case for storing the first column bed support (or pair of column bed supports).

According to step 808, a second column bed support may be installed in the chromatography column. As with the first column bed support, the second column bed support may be a new column bed support. In some embodiments, the second column bed support may have been used previously for, e.g., an established chromatography operation different from the first chromatography operation. In some embodiments, step 808 may include installing a pair of second chromatography column bed supports in a chromatography column.

According to step 810, a second chromatography operation may be run in the chromatography column, using the second chromatography column bed support (or pair of second column bed supports). The second operation may include, for example, a specific column pack (e.g., a particular stationary phase), a specific mobile phase, and/or a specific series of washes and/or buffers different from those required in the first chromatography operation. In some embodiments, like the first chromatography operation, the second chromatography operation may be configured to be run as a part of a manufacturing process for a drug product. In such embodiments, the drug product involved in the second chromatography operation may be different from a drug product involved in the first chromatography operation. In further embodiments, the first and second chromatography operations may constitute different steps in the manufacture or purification of the same drug product. In further embodiments, the second operation may be configured to be run as a part of a testing protocol or a research and/or development program different from a testing protocol or research/development program for which the first operation is run.

According to step 812, the second chromatography column bed support may be stored in a second storage case. In some embodiments, this step may include unpacking and cleaning the chromatography column. In some embodiments, for example, this may be performed after one or more iterations of the second chromatography operation is run. In some embodiments, the second column bed support or pair of column bed supports may be cleaned or sterilized prior to being stored in a second storage case. In some embodiments, the second storage case may be labeled or otherwise marked as a dedicated storage case for storing the second column bed support (or pair of column bed supports). The column may then be free for use with the first column bed support (or pair of column bed supports) again, or for use with a third column bed support or pair of column bed supports.

FIG. 8 depicts a flow chart of steps in a method arranged in one way; however, the present disclosure contemplates that steps may be added, removed, and/or performed out of order in the depicted method. The steps of FIG. 8 may also be performed multiple times in a repetitive sequence, as a part of one or more purification processes, drug product manufacturing processes, and/or research, development, or testing processes. The steps of FIG. 8 may be employed as a part of a larger chromatography management system, in which column bed supports and cases for storing column bed supports may be labeled, categorized, and stored in an inventory for regular, intermittent, or infrequent use.

Those skilled in the art will appreciate that the conception upon which this disclosure is based may readily be used as a basis for designing other devices, methods, and systems for carrying out the several purposes of the present disclosure. Accordingly, the claims are not to be considered as limited by the foregoing description.

What is claimed is:

1. A chromatography column bed support case, comprising:
   a housing having a body with an opening, an interior in the body accessible via the opening, and a lid configured to cover the opening;
   two removable inserts configured to fit inside the interior in a parallel configuration, each insert including a cavity configured to house a chromatography column bed support removed from a chromatography column; and
   a removable divider disposed between the inserts, wherein the divider is sized and configured to separate the inserts, wherein each of the inserts and the divider includes a centrally located through hole,
   wherein the cavity in each insert shares at least two dimensions with a chromatography column bed support, and each insert further comprises a recess located at an edge of the cavity, wherein the recess is deeper than the cavity.

2. The chromatography column bed support case of claim 1, wherein the inserts and the divider are sized and configured to extend from one end of the interior to an opposite end of the interior, and wherein each of the inserts and the divider includes two symmetrical indentations positioned diametrically opposite from one another.

3. The chromatography column bed support case of claim 1, further comprising:
   a plurality of spacer pads disposed between a side of one insert and the housing.

4. The chromatography column bed support case of claim 1, wherein the through holes are coaxial.

5. The chromatography column bed support case of claim 1, wherein the lid is removably affixed to the housing by a securing mechanism.

6. The chromatography column bed support case of claim 5, wherein the securing mechanism is selected from the group consisting of a latch, a clasp, a hook-and-eye closure, a tie closure, an elastic closure, and an adhesive.

7. The chromatography column bed support case of claim 6, wherein the securing mechanism is a latch.

8. The chromatography column bed support case of claim 1, wherein the housing and the dividers include polyethylene.

9. A chromatography column bed support storage system, comprising:
   a plurality of the chromatography column bed support cases of claim 1.

10. A method of storing a chromatography column bed support, the method comprising:
    placing the chromatography column bed support in the chromatography column bed support case of claim 1.

11. A method of managing a plurality of chromatography column bed supports dedicated to specific chromatography operations, the method comprising:
    storing each chromatography column bed support in the chromatography column bed support case according to claim 1; and
    prior to running a chromatography column, removing a chromatography column bed support from the chromatography column bed support case and installing the chromatography column bed support in the chromatography column.

12. The method of claim 11, further comprising:
storing a plurality of chromatography column bed supports in each of a plurality of reusable chromatography column bed support cases.

13. The method of claim 11, wherein the housing is a polyethylene box, and wherein the lid is attached to the housing via a hinge.

14. A chromatography column bed support case, comprising:
a housing having a body with an opening, an interior in the body accessible via the opening, and a lid configured to cover the opening;
two removable inserts configured to fit inside the interior in a parallel configuration, each removable insert including a cavity configured to house a chromatography column bed support removed from a chromatography column; and
a removable divider disposed between the inserts, wherein the divider is sized and configured to separate the inserts, and the divider is directly adjacent to both removable inserts,
wherein the cavity in each insert shares at least two dimensions with a chromatography column bed support, and each insert further comprises a recess located at an edge of the cavity, wherein the recess is deeper than the cavity.

15. The chromatography column bed support case of claim 14, wherein each of the inserts and the divider includes a centrally located through hole, and wherein the through holes are coaxial.

16. The chromatography column bed support case of claim 14, wherein the removable inserts and the divider are sized and configured to extend from one end of the interior to an opposite end of the interior, and wherein each of the removable inserts and the divider includes two symmetrical indentations positioned diametrically opposite from one another.

17. A chromatography column bed support case, comprising:
a housing having a body with an opening, an interior in the body accessible via the opening, and a lid configured to cover the opening;
a first chromatography column bed support removed from a chromatography column; and
a first removable insert configured to fit inside the interior in a parallel configuration, the first removable insert including a cavity housing the first chromatography column bed support, and a recess extending beyond an outer perimeter of the cavity, wherein the recess is deeper than the cavity, thereby allowing a user to reach underneath the first chromatography column bed.

18. The chromatography column bed support case of claim 17, further comprising:
a second chromatography column bed support removed from a chromatography column;
a second removable insert configured to fit inside the interior in a parallel configuration, the second removable insert including a cavity housing the second chromatography column bed support; and
a removable divider disposed between the first removable insert and the second removable insert, wherein the divider is sized and configured to separate the inserts.

19. The chromatography column bed support case of claim 17, wherein the removable divider is directly adjacent to both the first removable insert and the second removable insert.

* * * * *